(12) United States Patent
Coady et al.

(10) Patent No.: US 11,875,228 B2
(45) Date of Patent: Jan. 16, 2024

(54) CLASSIFYING QUANTUM ERRORS

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 158 days.

(21) Appl. No.: 17/585,922

(22) Filed: Jan. 27, 2022

(65) Prior Publication Data

US 2023/0237364 A1 Jul. 27, 2023

(51) Int. Cl.
*G06N 10/70* (2022.01)
*G06N 10/80* (2022.01)

(52) U.S. Cl.
CPC .............. *G06N 10/70* (2022.01); *G06N 10/80* (2022.01)

(58) Field of Classification Search
CPC ................................ G06N 10/70; G06N 10/80
See application file for complete search history.

(56) References Cited

U.S. PATENT DOCUMENTS

| | | | |
|---|---|---|---|
| 10,922,166 B2 | 9/2021 | Caldato et al. | |
| 2021/0042652 A1* | 2/2021 | Das | G06N 10/00 |
| 2022/0172098 A1* | 6/2022 | Johri | G06N 10/70 |
| 2022/0382626 A1* | 12/2022 | Fowler | G06N 10/70 |
| 2023/0129732 A1* | 4/2023 | Schmitz | G06N 10/20 |
| | | | 714/10 |

FOREIGN PATENT DOCUMENTS

| | | |
|---|---|---|
| CN | 112734043 B | 11/2021 |
| WO | 2021208555 A1 | 10/2021 |

OTHER PUBLICATIONS

D. K. Park, C. Blank and F. Petruccione, "Robust quantum classifier with minimal overhead," 2021 International Joint Conference on Neural Networks (IJCNN), Shenzhen, China, 2021, pp. 1-7, (Year: 2021).*

Chinni, K.R., "Error Classification and Reduction in Solid State Qubits," Honors Thesis, Paper 394, Southern Illinois University Carbondale, May 2015, 25 pages.

(Continued)

*Primary Examiner* — Cynthia Britt
(74) *Attorney, Agent, or Firm* — Dority & Manning, P.A.

(57) ABSTRACT

The examples disclosed herein provide classifying quantum errors. In particular, a classical computing system receives quantum error data from a first quantum computing device of a quantum computing system. The quantum error data includes error identification data and error correction data. The error identification data is associated with occurrence of a quantum error. The error correction data is associated with a corrective action taken by the first quantum computing device to correct the quantum error. The classical computing system determines an error type of the quantum error of the error identification data. The classical computing system associates an error classification tag with the quantum error data. The error classification tag identifies a quantum error type. The classical computing system sends the error classification tag to the first quantum computing device. The classical computing system processes a quantum computing request based on the error classification tag.

20 Claims, 5 Drawing Sheets

(56) References Cited

OTHER PUBLICATIONS

Denchev, V. et al., "Robust Classification with Adiabatic Quantum Optimization," qualarXiv:1205.1148v2 [quant-ph], May 30, 2012, 17 pages.
Hashim, A. et al., "Randomized compiling for scalable quantum computing on a noisy superconducting quantum processor," arXiv:2010.00215v2 [quant-ph], May 12, 2021, 37 pages.
Huang, L. et al., "Classification and purification for the independent quantum channel through quantum error-correction," arXiv:2104.12952v3 [quant-ph], Oct. 26, 2021, 5 pages.
Sheth, M. et al., "Neural ensemble decoding for topological quantum error-correcting codes," arXiv:1905.02345v2 [quant-ph], Mar. 24, 2020, 9 pages.

\* cited by examiner

CLASSIFYING QUANTUM ERRORS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

SUMMARY

The examples disclosed herein provide classifying quantum errors. In particular, a classical computing system receives quantum error data from a first quantum computing device of a quantum computing system. The quantum error data includes error identification data and error correction data. The error identification data is associated with occurrence of a quantum error. The error correction data is associated with a corrective action taken by the first quantum computing device to correct the quantum error. The classical computing system determines an error type of the quantum error of the error identification data. The classical computing system associates an error classification tag with the quantum error data. The error classification tag identifies a quantum error type. The classical computing system sends the error classification tag to the first quantum computing device. The classical computing system processes a quantum computing request based on the error classification tag.

In one implementation, a method is provided. The method includes receiving, by a classical computing system comprising one or more processor devices, quantum error data from a first quantum computing device of a quantum computing system. The quantum error data includes error identification data and error correction data. The error identification data is associated with occurrence of a quantum error. The error correction data is associated with a corrective action taken by the first quantum computing device to correct the quantum error. The method further includes determining, by the classical computing system, an error type of the quantum error of the error identification data. The method further includes associating, by the classical computing system, an error classification tag with the quantum error data. The error classification tag identifies a quantum error type. The method further includes sending, by the classical computing system, the error classification tag to the first quantum computing device. The method further includes processing, by the classical computing system, a quantum computing request based on the error classification tag.

In another implementation, a classical computing system is disclosed. The classical computing system includes a processor device to receive quantum error data from a first quantum computing device of a quantum computing system. The quantum error data includes error identification data and error correction data. The error identification data is associated with occurrence of a quantum error. The error correction data is associated with a corrective action taken by the quantum computing device to correct the quantum error. The processor device is further to determine an error type of the quantum error of the error identification data. The processor device is further to associate an error classification tag with the quantum error data. The error classification tag identifies a quantum error type. The processor device is further to send the error classification tag to the first quantum computing device. The processor device is further to process a quantum computing request based on the error classification tag.

In another implementation, a computer program product is disclosed. The computer program product is stored on a non-transitory computer-readable storage medium and includes instructions to cause a processor device of a classical computing system to receive quantum error data from a first quantum computing device of a quantum computing system. The quantum error data includes error identification data and error correction data. The error identification data is associated with occurrence of a quantum error. The error correction data is associated with a corrective action taken by the quantum computing device to correct the quantum error. The processor device is further to determine an error type of the quantum error of the error identification data. The processor device is further to associate an error classification tag with the quantum error data, the error classification tag identifying a quantum error type. The processor device is further to send the error classification tag to the first quantum computing device. The processor device is further to process a quantum computing request based on the error classification tag.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing devices. While qubits can be used to perform operations that would be impractical or impossible to perform with classical bits, qubits also suffer from inherent instabilities that may be caused by factors such as susceptibility to interference from their operating environments, faulty preparation, faulty gates, and the like. These instabilities may manifest as quantum errors, such as incorrect data values and/or quantum states, that affect the qubits.

For this reason, conventional quantum computing devices employ quantum error correction (QEC) services to detect and remedy quantum errors that may occur while executing quantum services. Such QEC services make use of a large number of additional qubits (relative to the number of qubits required to perform a quantum operation) to detect quantum errors that may occur, and to perform corrective actions.

In this regard, the examples herein disclose a classical computing service to classify types of errors to proactively reduce errors, optimize quantum computing requests, and/or optimize quantum computing request distribution, or the like. In particular, the classical computing service receives quantum error data that includes error identification data and error correction data, determines an error type of a quantum error of the error identification data, and associates an error classification tag with the quantum error data. Accordingly, the error classification tags are used by the quantum computing system to reduce errors associated with and/or improve operation of the quantum computing system.

Figure 1:
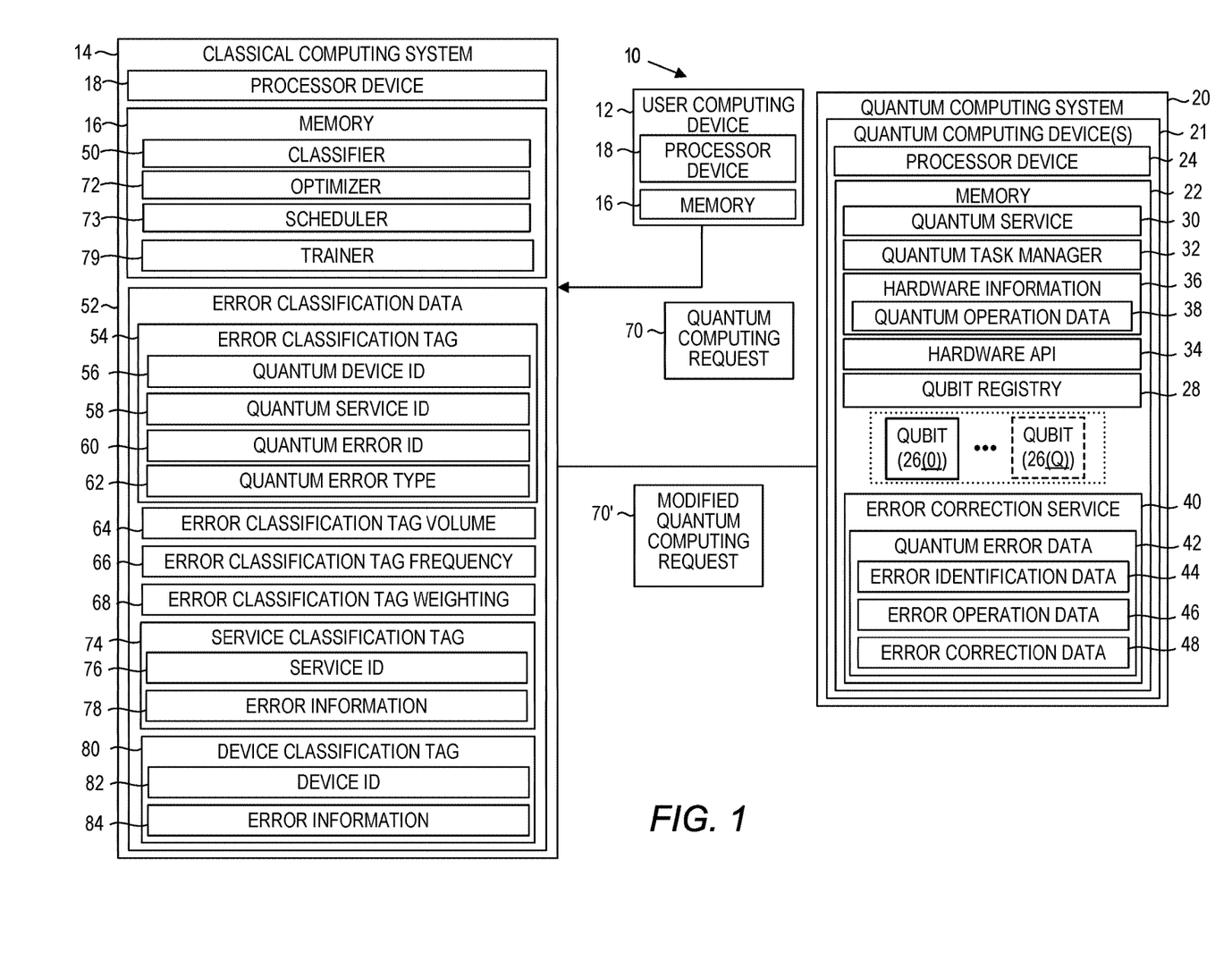
FIG. 1 is a block diagram of a computing system to classify a quantum error, according to one example.

FIG. 1 is a block diagram of a computing system 10 according to one example. The computing system 10 includes a user computing device 12 and a classical computing system 14, which are classical computing devices including a memory 16 and a processor device 18. In certain implementations, the classical computing system 14 includes functionality provided by the user computing device 12. The computing system 10 includes a quantum computing system 20 with a plurality of quantum computing devices 21 that each include a system memory 22 and a processor device 24. The quantum computing devices 21 may also be referred to as quantum machines 21. The user computing device 12, the classical computing system 14, and/or the quantum computing system 20 are all communicatively coupled via a classical communications link (not shown), which may include a private network or a public network such as the internet. It is to be understood that the computing system 10, according to some examples, may include other quantum computing devices and/or classical computing devices that are not illustrated in FIG. 1. Additionally, the user computing device 12, the classical computing system 14, and/or the quantum computing system 20 in some examples may include constituent elements in addition to those illustrated.

In the example of FIG. 1, each quantum computing device 21 implements a set of one or more qubits 26(0)-26(Q) (referred to generally as qubits 26) for use by quantum services executed by the quantum computing device 21. To maintain information for the qubit(s) 26, the quantum computing devices 21 may each include a qubit registry 28, which includes a plurality of qubit registry entries, each corresponding to a qubit such as the one or more qubits 26. The qubit registry 28 maintains and provides access to data relating to the qubits implemented by the quantum computing device 21, such as a count of the total number of qubits implemented by the quantum computing device 21 and a count of the number of available qubits that are currently available for allocation, as non-limiting examples. Each of the qubit registry entries of the qubit registry 28 also stores qubit metadata for a corresponding qubit 26. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 21 executes one or more quantum services 30. The quantum service 30 is a process that executes on a quantum computing device 21 and employs qubits 26 to provide desired functionality. The quantum service 30 is defined using a quantum service definition, such as provided by a quantum assembly (QASM) file, which includes one or more quantum programming instructions. QASM is a programming language that specifies quantum circuits as input to a quantum computer by declaring classical bits and qubits and describing operations on the qubits and measurements needed to obtain a classical result based on the qubits.

Execution of quantum services 30 is facilitated by a quantum task manager 32, which handles operations for creating, monitoring, and terminating quantum services 30. The quantum task manager 32 may provide an interface (not shown) through which other services or tasks may request specific information regarding the qubits 26, the quantum service 30, and/or the quantum computing device 21. Additionally, information regarding the status and functionality of the quantum computing device 21 and the elements thereof may be made accessible to other processes via a hardware application programming interface (API) 34.

Each quantum computing device 21 includes a physical enclosure containing qubits 26. Further, each quantum computing device 21 includes hardware information 36. Hardware information 36 may include load, operating temperature, noise, error rate, last time rebooted, hardware load, or the like. The hardware information 36 may be general or time-sensitive information. For example, the hardware information 36 may include load-based parameters, such as a low processing load threshold, a high processing load threshold, a low qubit usage threshold, a high qubit usage threshold, a low application queue threshold, a high application queue threshold, or the like. Hardware information 36 may include event-based parameters, such as low operating temperature threshold, high operating temperature threshold, or the like. Hardware information 36 may further include global operating parameters, such as a time, time period, processing load, available memory, count of executing processes, application queue, qubit usage, count of available qubits 26, and/or operating temperature, or the like. The hardware information 36 may include global operating conditions, such as system load, system response time, operating temperature, state of the qubits (e.g., qubit age, coherence time, and/or the like), or the like.

Accordingly, the hardware information 36 may include quantum operation data 38, such as historical quantum operation data or current quantum operation data. The historical quantum operation data may provide generalized information about the general historical performance of the quantum computing device 21, such as whether the quantum computing device 21 typically operates at a high temperature. The current quantum operation data may provide time sensitive information of the quantum computing device, such as whether the quantum computing device 21 is currently operating at a high temperature.

Qubits 26 generally require very specific environmental conditions for operation. Quantum runs can vary significantly depending on operating conditions of the quantum computing device 21, such as processing load, temperature variance, maintenance schedule, implementation strategy, qubit type, or the like.

Each quantum computing device 21 may include an error correction service 40 which compiles quantum error data 42. The quantum error data 42 may include error identification data 44, error operation data 46, and/or error correction data 48. In particular, the error identification data 44 identifies the error. The error operation data 46 identifies the operating conditions of the quantum computing device 21 when the error occurred. For example, the error operation data 46 comprises at least one of processing speed, temperature, noise, error rate, hardware load, or resource utilization. The error correction data 48 includes the steps the quantum computing device 21 took to rectify the error. The error correction service 40 then sends the quantum error data 42 to the classical computing system 14.

The classical computing system 14 includes a classifier 50 to analyze and process the quantum error data 42. The classifier 50 receives quantum error data 42 (e.g., data logs) from the quantum computing device 21 of the quantum computing system 20. Using machine learning, the classifier 50 determines an error type of a quantum error of the quantum error data 42. The classifier 50 may generate error classification data 52. For example, the classifier 50 may generate and then associate an error classification tag 54 with the quantum error of the quantum error data 42. The error classification tag 54 includes a quantum device ID 56, a quantum service ID 58, a quantum error ID 60, and/or a quantum error type 62, where the quantum error type 62 may include, for example, decoherence or other quantum noise.

The classifier 50 sends the error classification tag 54 to the quantum computing device 21 of the quantum computing system 20. In this way, the error classification tag 54 may be sent to other quantum computing devices 21 that did not incur the specific error. For example, the classifier 50 may receive quantum error data 42 from a first quantum computing device 21 but then send error classification data 52 including the error classification tag 54 to a second quantum computing device 21. The classifier 50 and/or other quantum computing devices 21 may know whether a particular quantum computing device 21 is persistently having errors and/or error corrections of a particular type. This allows for optimization and error prevention. For example, the classical computing system 14 may see that a particular quantum service 30 and/or quantum computing device 21 is prone to a specific type of error, such as being sensitive to noise, resource starvation, or the like.

The classifier 50 may further generate additional data that is local to the quantum computing device 21 and/or global to the quantum computing system 20. For example, error classification data 52, generated by the classifier 50 and/or received from the quantum computing device 21, may include an error classification tag volume 64, an error classification tag frequency 66, and/or an error classification tag weighting 68, or the like. The error classification tag volume 64 indicates the number of errors encountered by a quantum service 30 and/or quantum computing device 21. The error classification tag frequency 66 indicates how frequent a particular type of error is being encountered by a quantum service 30 and/or quantum computing device 21. The error classification tag weighting 68 indicates the severity of the error.

The error classification tag 54 may also be used to monitor the health of a quantum computing system 20 and/or quantum computing devices 21 thereof. For example, the temperature of a quantum computing device 21 may be within normal ranges, but noise and errors are being attributed to heat. Such information may be used to assess whether or not the quantum computing device 21 is in need of maintenance and/or is able to handle certain quantum workload volumes and/or types. If a quantum computing device 21 is prone to producing errors under certain conditions, error correction may be designed into the quantum computing device 21, thereby preventing the error from occurring at all. Such preventative action avoids expensive costs associated with errors from occurring.

The classical computing system 14 receives and processes a quantum computing request 70 based on one or more error classification tags 54. For example, an optimizer 72 may process or review the quantum computing request 70 to determine the type of request, sensitivities of the request, or the like. The optimizer 72 may analyze and/or compare the error classification tags 54 for each of the plurality of quantum computing devices 21 of the quantum computing system 20. The optimizer 72 may then identify which of the quantum computing devices 21 should process the quantum computing request 70. For example, the optimizer 72 may determine that the quantum computing request 70 is sensitive to noise and avoid quantum computing devices 21 that are prone to errors due to noise. It is noted that the optimizer 72 may also make such determinations based on the error classification tags 54 of each quantum computing devices 21 and/or the quantum operation data 38 of the quantum computing device 21. For example, the quantum operation data 38 may include at least one of processing speed, temperature, noise, error rate, hardware load, or resource utilization. The error classification tags 54 may be historical and/or current, such that the optimizer may evaluate trends of a quantum computing device 21 and/or current states of the quantum computing device 21.

In certain implementations, the optimizer 72 automatically modifies the quantum computing request 70 based on the error classification tag 54 and/or the quantum operation data 38 of one or more quantum computing devices 21 of the quantum computing system 20. The optimizer 72 may be configured to optimize execution of the quantum computing request 70 to maximize speed, maximize accuracy, minimize redundancy, and/or maximize payload distribution.

In certain implementations, the classifier 50 analyzes a plurality of error classification tags 54 and generates and assigns a service classification tag 74 to a quantum service type and/or a particular quantum service 30. The service classification tag 74 may include a service ID 76 and error information 78, such as identifying or including the error classification tags 54. The service classification tag 74 associates an operation characteristic to a quantum service 30. In certain implementations, the classifier 50 analyzes a plurality of error classification tags 54 and generates and assigns a device classification tag 80 to a quantum computing device type and/or a particular quantum computing device 21. The device classification tag 80 may include device ID 82 and error information 84, such as identifying or including the error classification tags 54. Accordingly, the classifier 50 may identify local or global trends or operating characteristics of the quantum service 30 and/or the quantum computing device 21. Further, the optimizer 72 may process the quantum computing request 70 based on the service classification tag 74 and/or the device classification tag 80. Accordingly, such tags may be used proactively to optimize and/or avoid errors in processing the quantum computing request 70.

To improve execution of the one or more quantum computing requests 70, the optimizer 72 may modify one or more quantum computing requests 70 to increase parallel execution of the plurality of quantum computing requests, to maximize speed, maximize accuracy, minimize redundancy, and/or maximize payload distribution, or the like.

Once optimized, the modified quantum computing request 70' may be sent by the classical computing system 14 to a quantum computing device 21 of the quantum computing system 20. For example, the optimizer 72 forwards the modified quantum service request 70' to a scheduler 73, which manages the routing of the modified quantum service requests 70' to the quantum computing system 20. Accordingly, the optimizer 72 modifies the quantum computing request 70 to generate the optimized quantum service request 70' identifying the optimal quantum computing device 21 and/or the optimal qubit type.

The scheduler 73 may schedule executions of quantum computing requests 70 in accordance with execution environment requirements in view of a current state of the quantum computing devices 21. Examples of the execution environment requirement(s) may include an error rate threshold, a channel load rate threshold for a quantum communication channel within the quantum computing system 20, a coherence time threshold for the quantum computing system and/or for each qubit provided by the quantum computing system, and a temperature threshold for a temperature of the quantum computing system, or the like.

It is noted that the conflict avoidance and optimization discussed above may be applied locally to a single quantum computing device 21 or globally across multiple quantum computing devices 21 in a quantum computing system 20. For example, in certain implementations, the optimizer 72 may be configured to take multiple request batches, each with multiple quantum computing requests 70, and modify the quantum computing requests 70 across multiple batches for efficient distribution across multiple quantum computing devices 21 of the quantum computing system 20.

In certain implementations, the optimizer 72 is configured to account for qubit type and/or executing quantum computing device 21 with respect to errors. For example, in certain implementations, the optimizer 72 determines to avoid a certain optimal qubit type but is agnostic to which quantum computing device 21 executes the quantum computing request 70.

In certain implementations, the classical computing system 14 includes a trainer 79 to train the error correction service 40 of the quantum computing device 21 based on the error classification tag 54. For example, the error correction service 40 may be trained to take preventative corrective action based on the error classification tag 54 to prevent occurrence of a quantum error.

In certain implementations, the trainer uses a quantum error correction algorithm trainer (QECAT), using a QECAT table including metadata. The metadata may include information relating to each corresponding quantum error itself, such as an indication of a quantum error type, a timestamp indicating when the quantum error occurred, and/or an indication of a corrective action taken by the error correction service 40 to correct the quantum error. Some examples may provide that the metadata may include information relating to a qubit affected by each corresponding quantum error, such as a qubit identifier and/or a source QASM file identifier for the qubit. According to some examples, the metadata may include information relating to the operating environment of a quantum computing device, such as an identifier of one or more concurrently executing quantum services, an identifier of one or more scheduled quantum services, and/or an indication of an environmental attribute of a quantum computing device (e.g., an operating temperature at a particular point in time).

In exemplary operation, the trainer 79 identifies a subset of the QECAT table entries that correspond to an occurrence of a quantum error. The trainer 79 then obtains metadata from each QECAT table entry of the subset and identifies a common characteristic of each occurrence of the quantum error based on the metadata.

As non-limiting examples, the common characteristic may comprise a quantum service that was executing during each occurrence of the quantum error, a particular qubit that was in use during each occurrence of the quantum error, and/or an operating environment characteristic of a quantum computing device (e.g., temperature, geographic location, processor load, and the like) during each occurrence of the quantum error.

Based on the common characteristic, the trainer 79 determines a preventative action (e.g., an action that may be performed by a quantum computing device such as the quantum computing device 21) to prevent a future occurrence of the quantum error. For example, if the analysis of the metadata by the trainer 79 identifies a common characteristic of an operating environment in which the quantum error occurred, the preventative action may comprise executing a quantum service such as the quantum service 30 only if the common characteristic does not apply to a current operating environment (e.g., a current temperature) of the quantum computing device 21. The preventative action in some examples may comprise modifying a source QASM file based on the common characteristic (e.g., if the quantum error is related to a particular quantum service, a particular qubit, a particular gate configuration, and the like, as non-limiting examples). In examples in which the common characteristic relates to, e.g., a specific quantum computing device or hardware, the preventative action may comprise selecting a quantum computing device 21 on which to execute a quantum service 30.

Figure 2:
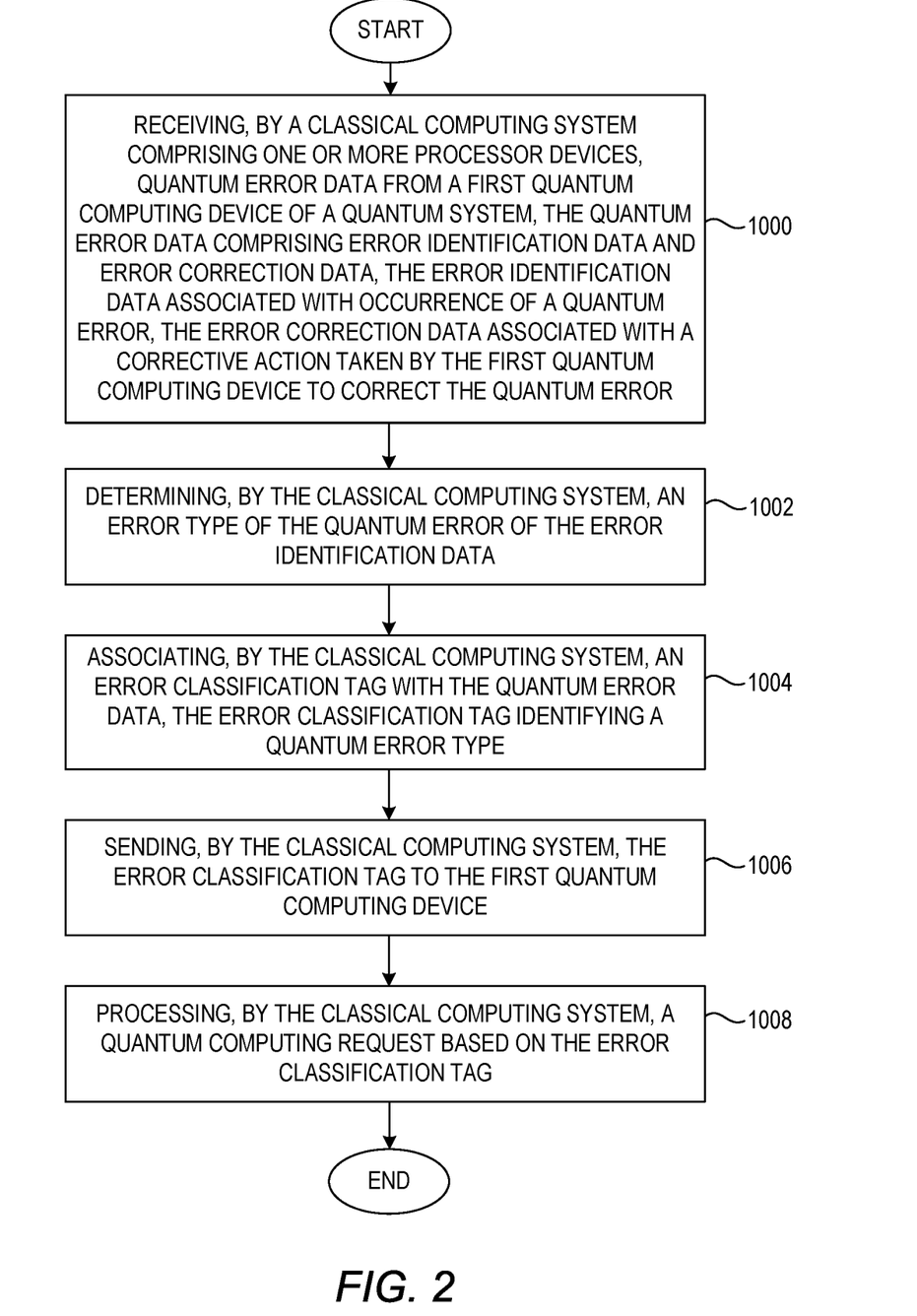
FIG. 2 is a flowchart of a method to classify a quantum error, according to one example.

FIG. 2 is a flowchart of a method to classify a quantum error according to one example. FIG. 2 will be discussed in conjunction with FIG. 1. A classical computing system 14 receives quantum error data 42 from a first quantum computing device 21 of a quantum computing system. The quantum error data 42 includes error identification data 44 and error correction data 48. The error identification data 44 is associated with occurrence of a quantum error. The error correction data 48 is associated with a corrective action taken by the first quantum computing device 21 to correct the quantum error (1000). The classical computing system 14 determines an error type of the quantum error of the error identification data (1002). The classical computing system 14 associates an error classification tag 54 with the quantum error data 42. The error classification tag 54 identifies a quantum error type 62 (1004). The classical computing system 14 sends the error classification tag 54 to the first quantum computing device 21 (1006). The classical computing system 14 processes a quantum computing request 70 based on the error classification tag 54 (1008).

Figure 3:
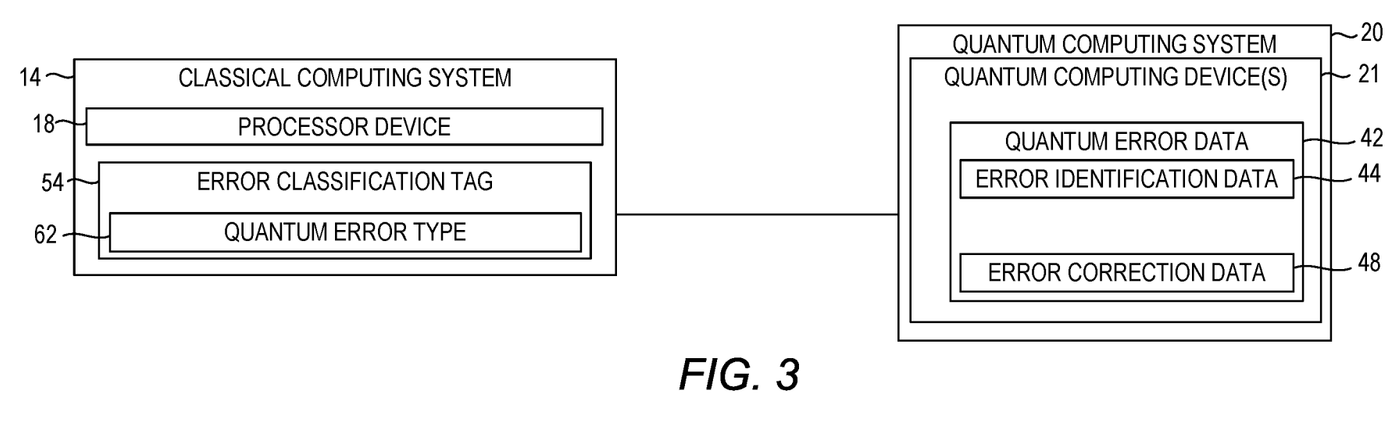
FIG. 3 is a simplified block diagram of the computing system illustrated in FIG. 1, according to one implementation.

FIG. 3 is a simplified block diagram of the processor device illustrated in FIG. 1, according to one implementation. In this example, the system includes a classical computing system 14 with a processor device 18. The classical computing system 14 receives quantum error data 42 from a first quantum computing device 21 of a quantum computing system. The quantum error data 42 includes error identification data 44 and error correction data 48. The error identification data 44 is associated with occurrence of a quantum error. The error correction data 48 is associated with a corrective action taken by the first quantum computing device 21 to correct the quantum error. The classical computing system 14 determines a quantum error type 62 of the quantum error of the error identification data 44. The classical computing system 14 associates an error classification tag 54 with the quantum error data 42. The error classification tag 54 identifies a quantum error type 62. The classical computing system 14 sends the error classification tag 54 to the first quantum computing device 21. The classical computing system 14 processes a quantum computing request 70 based on the error classification tag 54.

Figure 4:
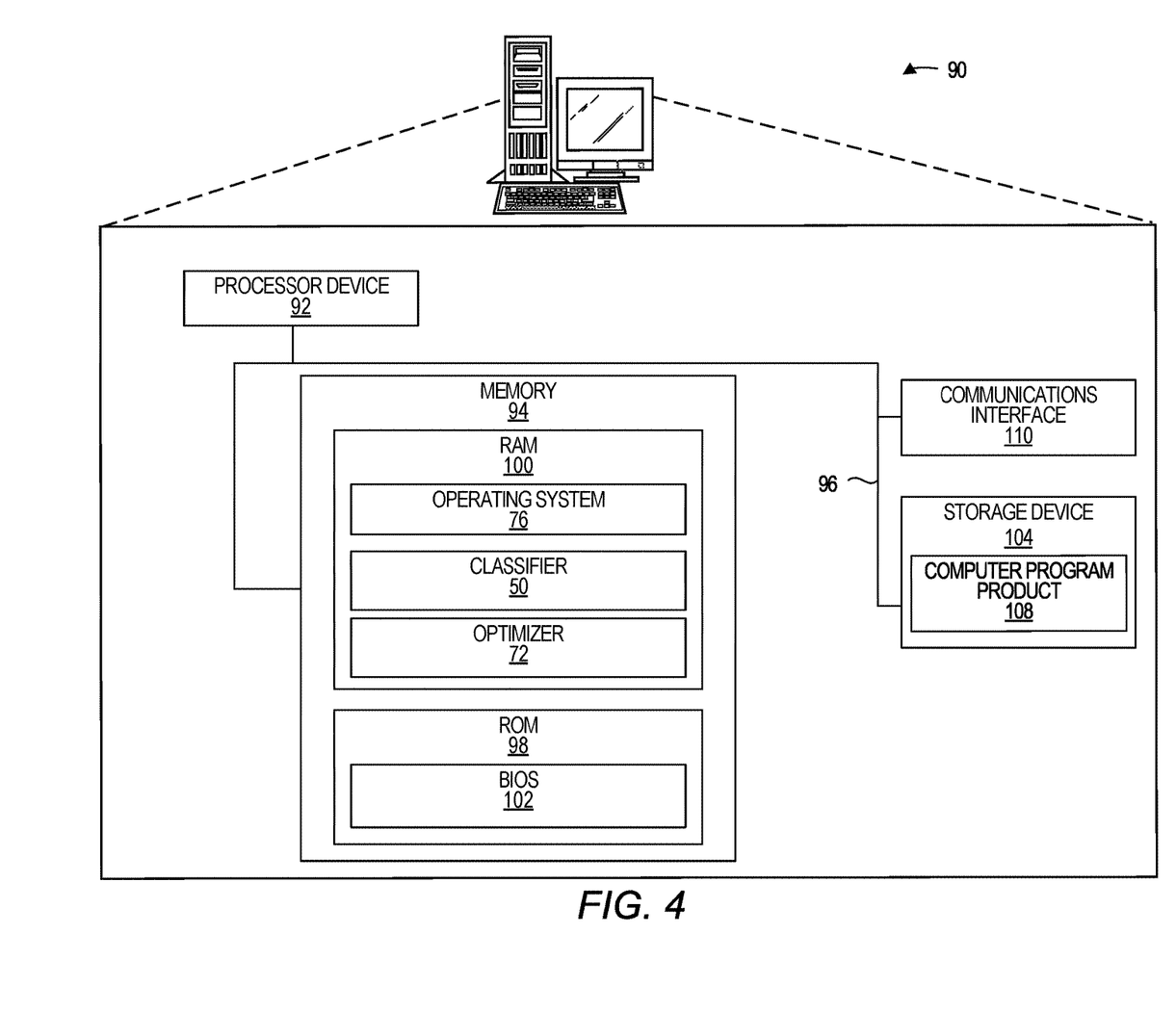
FIG. 4 is a block diagram of a computing device suitable for implementing one or more of the processing devices disclosed herein, according to one implementation.

FIG. 4 is a block diagram of a computing device 90 containing components suitable for implementing any of the processing devices disclosed herein. The computing device 90 includes a processor device 92, a system memory 94, and a system bus 96. The system bus 96 provides an interface for system components including, but not limited to, the system memory 94 and the processor device 92. The processor device 92 can be any commercially available or proprietary processor.

The system bus 96 may be any of several types of bus structures that may further interconnect to a memory bus (with or without a memory controller), a peripheral bus, and/or a local bus using any of a variety of commercially available bus architectures. The system memory 94 may include non-volatile memory 98 (e.g., read-only memory (ROM), erasable programmable read-only memory (EPROM), electrically erasable programmable read-only memory (EEPROM), or the like), and volatile memory 100 (e.g., random-access memory (RAM)). A basic input/output system (BIOS) 102 may be stored in the non-volatile memory 98 and can include the basic routines that help transfer information between elements within the computing device 90. The volatile memory 100 may also include a high-speed RAM, such as static RAM, for caching data.

The computing device 90 may further include or be coupled to a non-transitory computer-readable storage medium such as storage device 104, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 104 and other drives associated with computer-readable media and computer-usable media may provide non-volatile storage of data, data structures, computer-executable instructions, and the like.

A number of modules can be stored in the storage device 104 and in the volatile memory 100, including an operating system 106 and one or more program modules, which may implement the functionality described herein in whole or in part. All or a portion of the examples herein may be implemented as a computer program product 108 stored on a transitory or non-transitory computer-usable or computer-readable storage medium, such as the storage device 104, which includes complex programming instructions, such as complex computer-readable program code, to cause the processor device 92 to carry out the steps described herein. Thus, the computer-readable program code can comprise software instructions for implementing the functionality of the examples described herein when executed on the processor device 92. The processor device 92, in conjunction with the network manager in the volatile memory 100, may serve as a controller or control system for the computing device 90 that is to implement the functionality described herein.

The computing device 90 may also include one or more communication interfaces 110, depending on the particular functionality of the computing device 90. The communication interfaces 110 may comprise one or more wired Ethernet transceivers, wireless transceivers, fiber, satellite, and/or coaxial interfaces by way of non-limiting examples.

Figure 5:
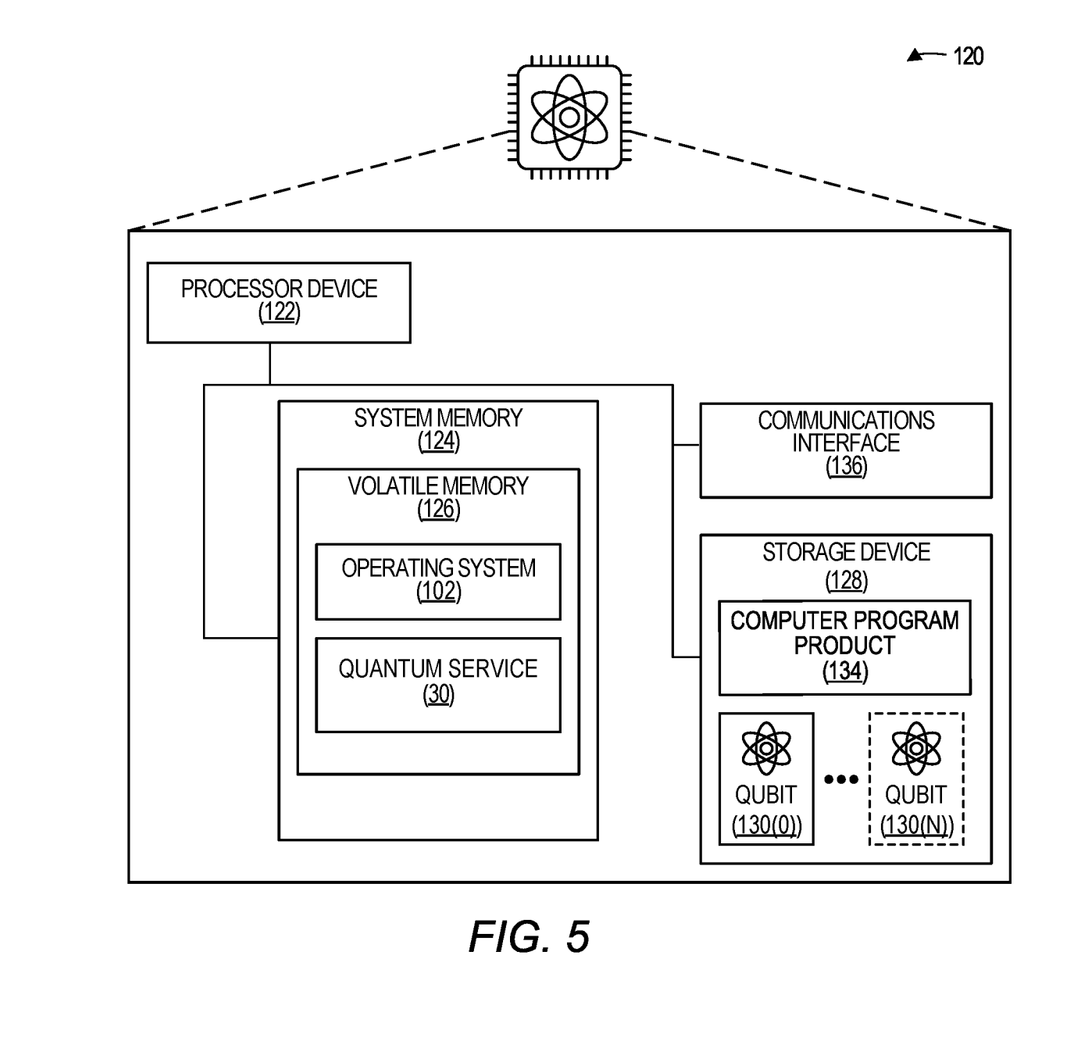
FIG. 5 is a block diagram of a quantum computing device suitable for implementing examples, according to one example.

FIG. 5 is a block diagram of a quantum computing device 120, such as the quantum computing device 21 of FIG. 1, suitable for implementing examples according to one example. The quantum computing device 120 may comprise any suitable quantum computing device or devices. The quantum computing device 120 can operate using classical computing principles or quantum computing principles. When using quantum computing principles, the quantum computing device 120 performs computations that utilize quantum-mechanical phenomena, such as superposition and entanglement. The quantum computing device 120 may operate under certain environmental conditions, such as at or near zero degrees (0°) Kelvin. When using classical computing principles, the quantum computing device 120 utilizes binary digits that have a value of either zero (0) or one (1).

The quantum computing device 120 includes a processor device 122 and a system memory 124. The processor device 122 can be any commercially available or proprietary processor suitable for operating in a quantum environment. The system memory 124 may include volatile memory 126 (e.g., random-access memory (RAM)). The quantum computing device 120 may further include or be coupled to a non-transitory computer-readable medium such as a storage device 128. The storage device 128 and other drives associated with computer-readable media and computer-usable media may provide non-volatile storage of data, data structures, computer-executable instructions, and the like. The storage device may also provide functionality for storing one or more qubits 130(0)-130(N).

A number of modules can be stored in the storage device 128 and in the volatile memory 126, including an operating system 132 and one or more modules. All or a portion of the examples may be implemented as a computer program product 134 stored on a transitory or non-transitory computer-usable or computer-readable medium, such as the storage device 128, which includes complex programming instructions, such as complex computer-readable program code, to cause the processor device 122 to carry out the steps described herein. Thus, the computer-readable program code can comprise computer-executable instructions for implementing the functionality of the examples described herein when executed on the processor device 122.

An operator may also be able to enter one or more configuration commands through a keyboard (not illustrated), a pointing device such as a mouse (not illustrated), or a touch-sensitive surface such as a display device (not illustrated). The quantum computing device 120 may also include a communications interface 136 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a classical computing system comprising one or more processor devices, quantum error data from a first quantum computing device of a quantum computing system, the quantum error data comprising error identification data and error correction data, the error identification data associated with occurrence of a quantum error, the error correction data associated with a corrective action taken by the first quantum computing device to correct the quantum error;
   determining, by the classical computing system, an error type of the quantum error of the error identification data;
   associating, by the classical computing system, an error classification tag with the quantum error data, the error classification tag identifying a quantum error type;
   sending, by the classical computing system, the error classification tag to the first quantum computing device; and
   processing, by the classical computing system, a quantum computing request based on the error classification tag.

2. The method of claim 1, wherein receiving, by the classical computing system, the quantum error data from the first quantum computing device of the quantum computing system, the quantum error data comprising the error identification data and the error correction data, further comprises:
   receiving, by the classical computing system, the quantum error data from the first quantum computing device of the quantum computing system, the quantum error data comprising the error identification data, the error correction data, and error operation data corresponding to operation of the first quantum computing device during occurrence of the quantum error.

3. The method of claim 2, wherein the error operation data comprises at least one of processing speed, temperature, noise, error rate, hardware load, or resource utilization.

4. The method of claim 1, further comprising sending, by the classical computing system, the error classification tag to a second quantum computing device.

5. The method of claim 1, wherein processing, by the classical computing system, the quantum computing request based on the error classification tag further comprises:
   processing, by the classical computing system, the quantum computing request based on the error classification tag, the quantum computing request comprising a Quantum Assembly (QASM) file.

6. The method of claim 1, wherein processing, by the classical computing system, the quantum computing request based on the error classification tag further comprises:
   comparing error classification tags of each of a plurality of quantum computing devices of the quantum computing system; and
   identifying a second quantum computing device to process the quantum computing request by analyzing, for each of the plurality of quantum computing devices of the quantum computing system, the error classification tags.

7. The method of claim 1, wherein processing, by the classical computing system, the quantum computing request based on the error classification tag further comprises:
   comparing error classification tags of each of a plurality of quantum computing devices of the quantum computing system; and
   identifying a second quantum computing device to process the quantum computing request by analyzing, for each of the plurality of quantum computing devices of the quantum computing system, the error classification tags and current operation data.

8. The method of claim 1, wherein processing, by the classical computing system, the quantum computing request based on the error classification tag further comprises:
   automatically modifying the quantum computing request based on the error classification tag.

9. The method of claim 1, wherein processing, by the classical computing system, the quantum computing request based on the error classification tag further comprises:
   automatically modifying the quantum computing request based on the error classification tag and current operation data of at least one quantum computing device of the quantum computing system.

10. The method of claim 9, wherein automatically modifying the quantum computing request based on the error classification tag and the current operation data of the at least one quantum computing device of the quantum computing system further comprises:
    automatically modifying the quantum computing request based on the error classification tag and the current operation data of the at least one quantum computing device of the quantum computing system, the current operation data comprising at least one of processing speed, temperature, noise, error rate, hardware load, or resource utilization.

11. The method of claim 1, wherein processing, by the classical computing system, the quantum computing request based on the error classification tag further comprises:
    optimizing execution of the quantum computing request to maximize speed, maximize accuracy, minimize redundancy, or maximize payload distribution.

12. The method of claim 1, further comprising training an error correction service of the first quantum computing device based on the error classification tag.

13. The method of claim 1, further comprising taking, by an error correction service of the first quantum computing device, preventative corrective action based on the error classification tag to prevent occurrence of a quantum error.

14. The method of claim 1, wherein processing, by the classical computing system, the quantum computing request based on the error classification tag further comprises:
    processing, by the classical computing system, the quantum computing request based on classification data including the error classification tag, the classification data further comprising at least one of an error classification tag volume, an error classification tag frequency, or an error classification tag weighting.

15. The method of claim 1, further comprising:
- analyzing a plurality of error classification tags associated with a quantum service type executing on the quantum computing system; and
- assigning a service classification tag to the quantum service type based on the plurality of error classification tags, the service classification tag associating an operation characteristic of the quantum service type.

16. The method of claim 15, wherein processing, by the classical computing system, the quantum computing request based on the error classification tag further comprises:
- processing, by the classical computing system, the quantum computing request based on the service classification tag, the service classification tag at least partly based on the error classification tag.

17. The method of claim 1, further comprising:
- analyzing a plurality of error classification tags associated with the first quantum computing device; and
- assigning a device classification tag to the first quantum computing device based on the plurality of error classification tags, the device classification tag identifying an operation characteristic of the first quantum computing device.

18. The method of claim 17, wherein processing, by the classical computing system, the quantum computing request based on the error classification tag further comprises:
- processing, by the classical computing system, the quantum computing request based on the device classification tag, the device classification tag at least partly based on the error classification tag.

19. A classical computing system comprising:
a processor device to:
- receive quantum error data from a first quantum computing device of a quantum computing system, the quantum error data comprising error identification data and error correction data, the error identification data associated with occurrence of a quantum error, the error correction data associated with a corrective action taken by the quantum computing device to correct the quantum error;
- determine an error type of the quantum error of the error identification data;
- associate an error classification tag with the quantum error data, the error classification tag identifying a quantum error type;
- send the error classification tag to the first quantum computing device; and
- process a quantum computing request based on the error classification tag.

20. A non-transitory computer-readable storage medium that includes executable instructions to cause a processor device of a classical computing system to:
- receive quantum error data from a first quantum computing device of a quantum computing system, the quantum error data comprising error identification data and error correction data, the error identification data associated with occurrence of a quantum error, the error correction data associated with a corrective action taken by the quantum computing device to correct the quantum error;
- determine an error type of the quantum error of the error identification data;
- associate an error classification tag with the quantum error data, the error classification tag identifying a quantum error type;
- send the error classification tag to the first quantum computing device; and
- process a quantum computing request based on the error classification tag.

\* \* \* \* \*